United States Patent [19]

Yaotani et al.

[11] 4,445,721

[45] May 1, 1984

[54] DRAINING MECHANISM FOR AUTOMOTIVE DOOR

[75] Inventors: Kouichi Yaotani, Tokyo; Yasuyuki Ogawa, Yokosuka, both of Japan

[73] Assignees: Nissan Motor Co., Ltd.; Kato Hatsujo Kaisha Ltd., both of Yokohama, Japan

[21] Appl. No.: 322,957

[22] Filed: Nov. 19, 1981

[30] Foreign Application Priority Data

Nov. 19, 1980 [JP] Japan .............................. 55-165898[U]

[51] Int. Cl.³ .................................................. B60J 5/04
[52] U.S. Cl. ...................................... 296/154; 49/476
[58] Field of Search .................. 296/154; 49/502, 381, 49/476

[56] References Cited

U.S. PATENT DOCUMENTS 3,778,101 12/1973 Tsuda ...................................... 49/502
3,874,119 4/1975 Renner ................................. 296/154

FOREIGN PATENT DOCUMENTS 2510721 9/1976 Fed. Rep. of Germany ...... 296/154

Primary Examiner—Bruce H. Stoner, Jr.
Assistant Examiner—John A. Carroll
Attorney, Agent, or Firm—Schwartz, Jeffery, Schwaab, Mack, Blumenthal & Koch

[57] ABSTRACT

A draining mechanism for an automotive door in which the conventional sealing screen is eliminated in the door and a draining function is provided at the lower end bent outwardly of an inside decorative plate fastened through a gap on an inside panel along the lower end corner of the inside panel. Thus, the water introduced through openings perforated at the inside panel into the gap between the inside panel and the inside decorative plate can be exactly introduced externally of the compartment for an automobile.

10 Claims, 7 Drawing Figures

PRIOR ART FIG. 1
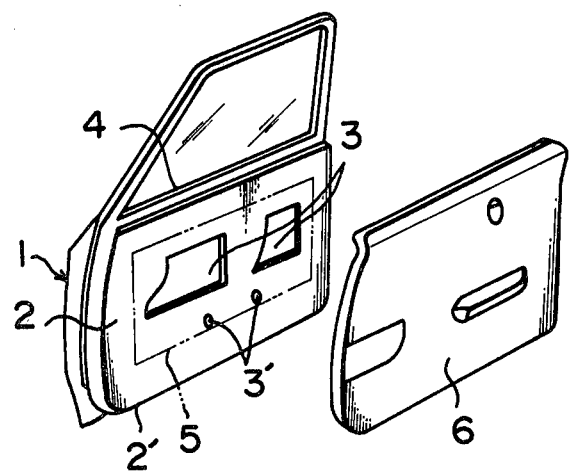
PRIOR ART FIG. 2
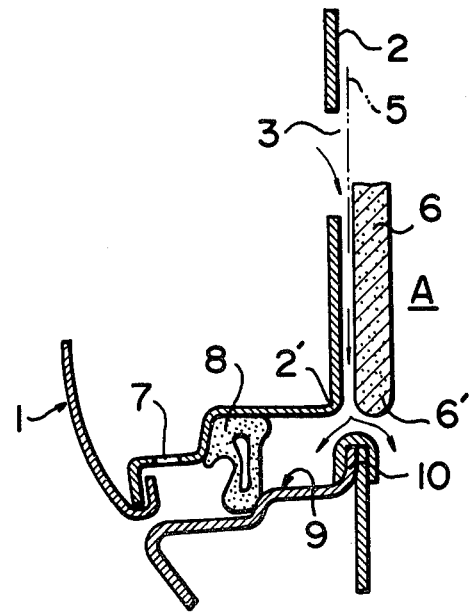

DRAINING MECHANISM FOR AUTOMOTIVE DOOR

BACKGROUND OF THE INVENTION

This invention relates to a draining mechanism for an automotive door and, particularly, to improvements in a draining mechanism for rain water or the like introduced into the interior of an automotive door with an inside decorative plate mounted thereon.

As shown in FIGS. 1 and 2, an inside panel 2 for a conventional automotive door 1 is formed with openings 3 for providing a window glass elevation mechanism or a door locking mechanism and so forth.

When it rains or the automobile is washed, water introduced from a window glass elevation port 4 into the door 1 may partly leaks through the openings 3 causing moisture in the interior of an indoor compartment A.

In order to prevent moisture in the compartment in the automobile, a sealing screen 5 has been mounted to block the openings 3, and an inside decorative plate 6 has then been fastened through the screen to the inside panel 2 with clips.

In such a conventional automotive door, the water thus introduced into the door 1 is drained through a penetration hole 7 formed at the lower portion of the door 1.

The introduction of water through the openings 3 into the interior of the door 1 is prevented by the sealing screen 5.

In the example of the conventional automotive door shown in FIGS. 1 and 2, a weather strip 8 is bonded to the lower surface of the inside panel 2 to confront the upper surface of the lower top portion 9 of a door mounting portion (a door way), and a projecting portion 10 is formed on the lower top portion 9 for making contact with the lower portion of the weather strip 8 bonded to the inside panel 2.

In the aforementioned conventional automotive door as thus constructed, the sealing screen 5 is, for the purpose of preventing the introduction of water partly into the interior of a compartment, additionally required to be provided and to be bonded as another working step. Accordingly, the number of components is thus increased, and the steps of assembling the automotive door is consequently increased, thus raising production cost. Further, when the sealing screen 5 is bonded, it must be bonded while taking careful attention so as not to clog with adhesive the small holes 3' shown in FIG. 1.

The small holes 3' are provided to drain any water into the door which was introduced through the openings 3 to the side of the sealing screen 5.

Further, as disclosed in U.S. Pat. No. 2,867,473, in a vehicle body panel sealing means, the opening between the flange and the door outer panel at the upper edges of the door panel is partially sealed by a conventional weather strip engaging opposite sides of the vertically moving door window. However, it is still possible for water to pass into the door wall through the opening. In this prior sealing means, the water will collect along the lower wall of the door wall particularly in the channel defined by flange portions and the door outer panel since this is the lowest portion of the bottom wall of the door wall and flange portion slopes toward the channel. To drain off this water, a number of spaced openings are provided in the flange portion. In this manner, the water which passes into the door well through the opening between the flange and the upper edge of the door outer panel collects only in the channel defined by the flange portions and the door outer panel and is drained by the openings.

SUMMARY OF THE INVENTION

Accordingly, a primary object of the invention is to provide a draining mechanism for an automotive door which can eliminate all the aforementioned disadvantages and drawbacks of the conventional automotive door.

Another object of the invention is to provide a draining mechanism for an automotive door in which water introduced through openings into the gap between the inside panel and the inside decorative plate can be, even if the conventional sealing screen is eliminated therefrom, positively introduced externally of the vehicle compartment.

A further object of the invention is to provide a draining mechanism for an automotive door in which the number of the components therefor can be reduced and the number of the steps of assembling the automotive door can also be decreased.

Still another object of the invention is to provide a draining mechanism for an automotive door which can be assembled in mass production by completely omitting the labor or positioning the conventional sealing screen in the automotive door.

According to one aspect of the invention, there is provided an improved draining mechanism for an automotive door in which the conventional sealing screen is eliminated in the door so as to remedy the aforementioned disadvantages and drawbacks, a draining function is provided at the lower end 6' of an inside decorative plate 6 by bending the lower end 6' in a predetermined direction together with a covering function for the lower end corner 2' of the inside panel 2 therewith.

The above and other objects and features of the invention will be apparent from a reading of the following description of the disclosure found in the accompanying drawings and the novelty thereof pointed out in the appended claims.

BRIEF DESCRIPTION OF THE DRAWINGS

FIG. 1 is an exploded perspective view showing a conventional automotive door;

FIG. 2 is a sectional view of the essential part of the conventional door shown in FIG. 1;

DESCRIPTION OF THE PREFERRED EMBODIMENTS

Figure 3:
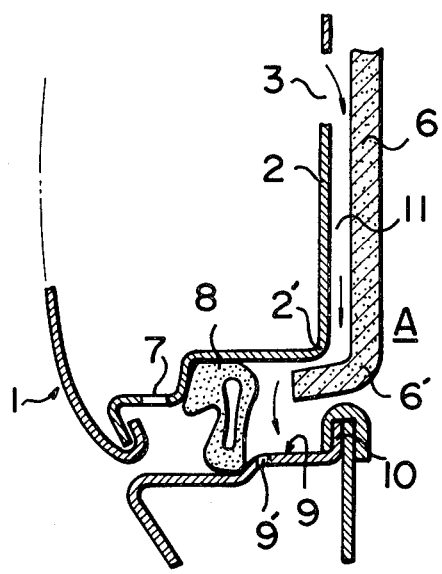
FIG. 3 is a sectional view showing a key part of one preferred embodiment of the draining mechanism for an automotive door constructed according to this invention.

Referring now to the drawings, FIG. 3 shows one preferred embodiment of the draining mechanism for an automotive door constructed according to the invention. Like reference numerals designate the same or equivalent components and parts shown in FIGS. 1, 2. An inside decorative plate 6 is fastened in a gap 11 to an inside panel 2 with clips (not shown) in the automotive door 1 as described with reference to FIGS. 1 and 2, and the lower end 6' of the inside decorative plate 6 is bent outwardly along the lower end corner of the inside panel 2 in the automotive door 1.

In the draining mechanism thus constructed in FIG. 3, water, such as rain water, which is introduced into the automotive door 1, through the openings 3 perforated at the inside panel 2 and into the gap 11 between the inside panel 2 and the inside decorative plate 6, will flow in the gap 11 between the inside panel 2 and the inside decorative plate 6 downwardly along the lower end 6' bent toward the outside of the automotive door 1. The water then flows between the bottom of the inside panel 2 having weather strip 8 bonded to the lower surface thereof and the lower top portion 9 of the projecting portion of the doorway 2 and then flows through a draining hole 9' perforated at the lower top portion 9 and thence outwardly of the door. Accordingly, the water does not enter the vehicle compartment A.

The inside decorative plate 6 is normally formed of soft synthetic board such as pulp pieces, resin and so forth, but can be further effectively operated by employing a resin plate formed of recently developed synthetic resin.

Figure 4:
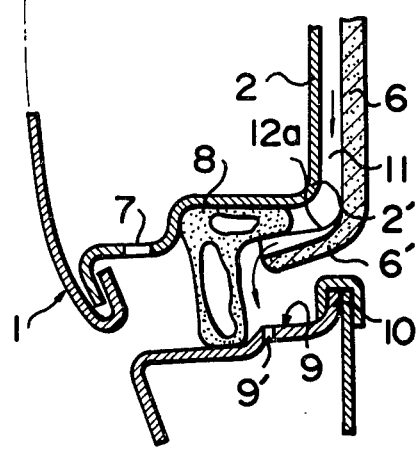
FIG. 4 is a view similar to FIG. 3 but showing another preferred embodiment of this invention.

FIG. 4 shows another preferred embodiment of the draining mechanism for the automotive door in accordance with the invention. A weather strip 8 is engaged and pressed by the lower end 6' of the inside decorative plate 6 which is formed as described above in the previous embodiment. The lower end 6' thus bent outwardly of the inside decorative plate 6 is partly urged and brought into contact with the weather strip 8.

Further, in the embodiment shown in FIG. 4, a drain guide portion 12a is formed in a recess on the contacting surface of the lower end 6' abutting the weather strip 8 of the inside decorative plate 6 for increasing the draining property thereof, and a draining hole 9' is perforated at the lower top portion 9 of the projecting portion of the doorway.

When water introduced through the openings 3 and the gap 11 between the inside panel 2 and the inside decorative plate 6 as described above is further introduced along the lower end 6' of the inside decorative plate 6, the water is temporarily retained on the lower top portion 9 of the projecting portion and is drained through the hole 9' of the lower top portion 9 externally therethrough.

Figure 5:
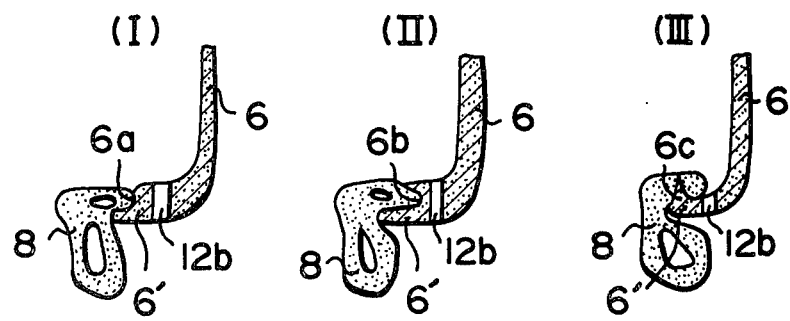
FIGS. 5I through 5III are sectional views showing various examples of holding a weather strip employed in the draining mechanism of the invention.

FIGS. 5I through 5III show various modifications of the weather strip 8 employed in the draining mechanism of the invention for preventing the separation tilt-down and floating of the weather strip 8 which is bonded to the lower surface of the inside panel 2. There is illustrated a variety of examples of special shapes of the lower ends 6' of the inside decorative plate 6 for positively retaining or holding the weather strip 8.

In FIG. 5I, the end of the lower end 6' of the inside decorative plate 6 is formed with a stepped portion 6a for urging and retaining the weather strip 8 which is bonded to the stepped portion 6a at the end of the decorative plate 6.

In FIG. 5II, the end of the lower end 6' of the inside decorative plate 6 is formed with a recess 6b for urging and retaining the weather strip 8 which is bonded to the recess 6b at the end of the decorative plate 6.

In FIG. 5III, the end of the lower end 6' of the inside decorative plate 6 is formed with an elevational projection 6c for engaging and retaining the weather strip 8 which is bonded to the projection 6c at the end of the decorative plate 6.

In FIGS. 5I through 5III, the lower end 6' of the inside decorative plate 6 is perforated with a hole 12b for draining the water introduced to the lower end 6' instead of the drain guide portion 12a of the previous embodiment shown in FIG. 4.

It should be understood from the foregoing description that in the draining mechanism for the automotive door provided with openings at the inside panel with an inside decorative plate fastened through a gap on the inside panel with clips and formed at the lower end thereof with an outwardly bent portion, the water introduced through the openings perforated at the inside panel and the gap can be, even if the conventional sealing screen is eliminated, guided externally of the vehicle compartment. The draining effect can be obtained by this draining mechanism and, the conventional sealing screen can be eliminated in the automotive door. Further the number of the components and parts can be reduced, and the number of the steps of assembling the door can also be decreased.

It should also be appreciated that since the draining mechanism for the automotive door made in accordance with the invention is thus constructed without the conventional sealing screen, the labor of positioning the sealing screen can be completely omitted, and the door can be generally and readily assembled in mass production.

It should also be understood that since the weather strip for preventing the leakage of water can itself be retained by the lower end of the inside decorative plate thus constructed in accordance with the invention, the droppage, the tilt-down and floating of the weather strip can also be prevented without any additional member. Further, since the draining hole is perforated at the lower end of the inside decorative plate, the draining function can be further improved in the draining mechanism of the invention.

What is claimed is:
1. A vehicle door structure comprising:
   (1) an exterior side panel,
   (2) an interior side panel having aperture sections therethrough for receiving, for example, window and lock mechanisms,
   (3) means for spacedly connecting said exterior and interior panels together along their lower ends thereby defining a space therebetween,
   (4) a weather strip member attached to said connecting means and extended to contact a portion of a doorway of said door, thereby forming a water barrier between said connecting means and said doorway,
   (5) a decorative plate spacedly disposed interiorly of said interior panel and defining a gap therebetween,
   (6) said decorative plate having a lower end portion bent outwardly, toward said weather strip member and disposed between said connecting means and said doorway for channeling water passing through said aperture section and said gap to a region between said connecting means and doorway and adjacent said weather strip member, and
   (7) drain means provided adjacent said weather strip member for draining water channeled thereto by said bent, lower end portion of said decorative plate to the exterior of said door structure whereby water passing through said aperture sections and gap is channeled outside of the area defined between said interior and exterior panels and exteriorly of said door structure.

2. A vehicle door structure as recited in claim 1 wherein said bent, lower end portion of said decorative plate contacts said weather strip member.

3. A vehicle door structure as recited in claim 2 wherein said bent, lower end portion of said decorative plate has a drain guide portion formed by a recess in a portion thereof.

4. A vehicle door structure as recited in claim 2 wherein said bent, lower end portion of said decorative plate is formed with a stepped portion contacting said weather strip member and said bent, lower end portion of said decorative plate is bonded to said weather strip member at said stepped portion.

5. A vehicle door structure as recited in claim 2 wherein said bent, lower end portion of said decorative plate is formed with a recess portion contacting said weather strip member and said bent, lower end portion of said decorative plate is bonded to said weather strip member at said recess portion.

6. A vehicle door structure as recited in claim 2 wherein said bent, lower end portion of said decorative plate is formed with an elevational projection contacting said weather strip member and said bent, lower end portion of said decorative plate is bonded to said weather strip member at said elevational projection.

7. A vehicle door structure as recited in claim 2 wherein said bent, lower end portion of said decorative plate has a perforation therethrough for channeling water into the region between said connecting means and doorway adjacent a lower top part of said doorway.

8. A vehicle door structure as recited in claim 4 wherein said bent, lower end portion of said decorative plate has a perforation therethrough for channeling water into the region between said connecting means and doorway adjacent a lower top part of said doorway.

9. A vehicle door structure as recited in claim 5 wherein said bent, lower end portion of said decorative plate has a perforation therethrough for channeling water into the region between said connecting means and doorway adjacent a lower top part of said doorway.

10. A vehicle door structure as recited in claim 6 wherein said bent, lower end portion of said decorative plate has a perforation therethrough for channeling water into the region between said connecting means and doorway adjacent a lower top part of said doorway.

* * * * *